Figure 5:
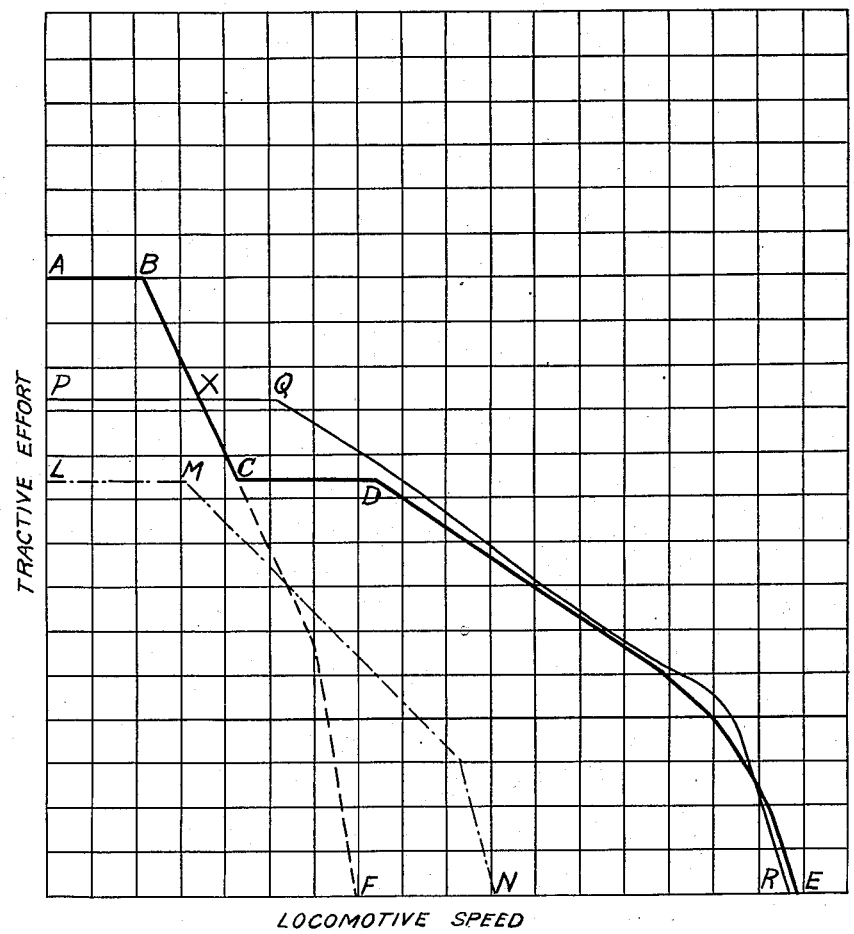

Dec. 2, 1952     L. F. R. FELL     2,619,800
INTERNAL-COMBUSTION ENGINE POWER PLANT
Filed Feb. 23, 1950     4 Sheets-Sheet 1
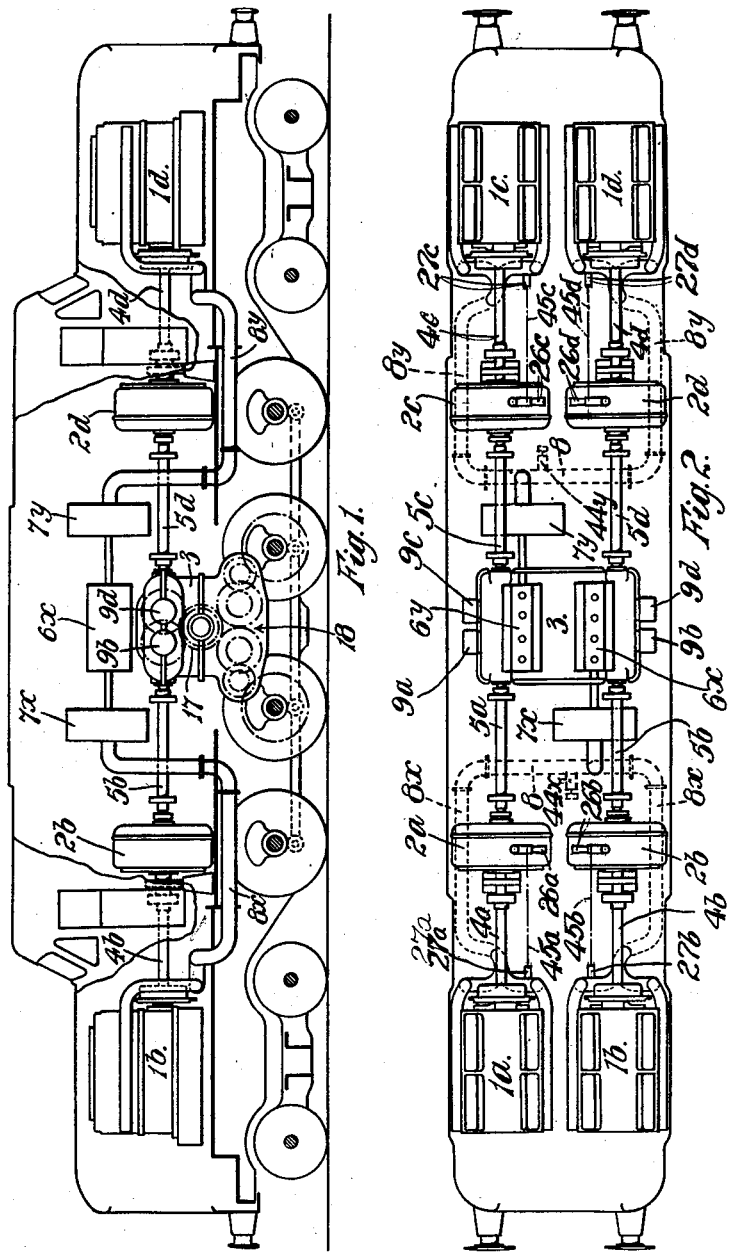
INVENTOR
Louis F. R. Fell

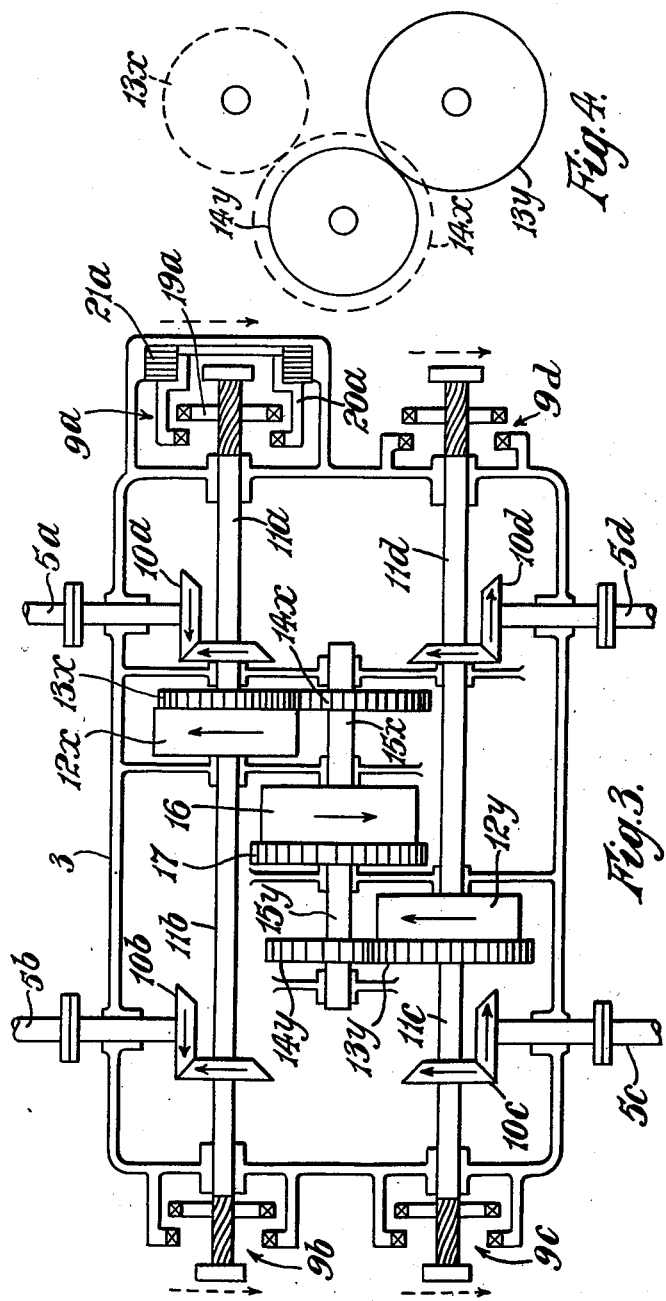

Dec. 2, 1952 L. F. R. FELL 2,619,800
INTERNAL-COMBUSTION ENGINE POWER PLANT
Filed Feb. 23, 1950 4 Sheets-Sheet 3

INVENTOR
Louis F. R. Fell
By [signature]
ATTY.

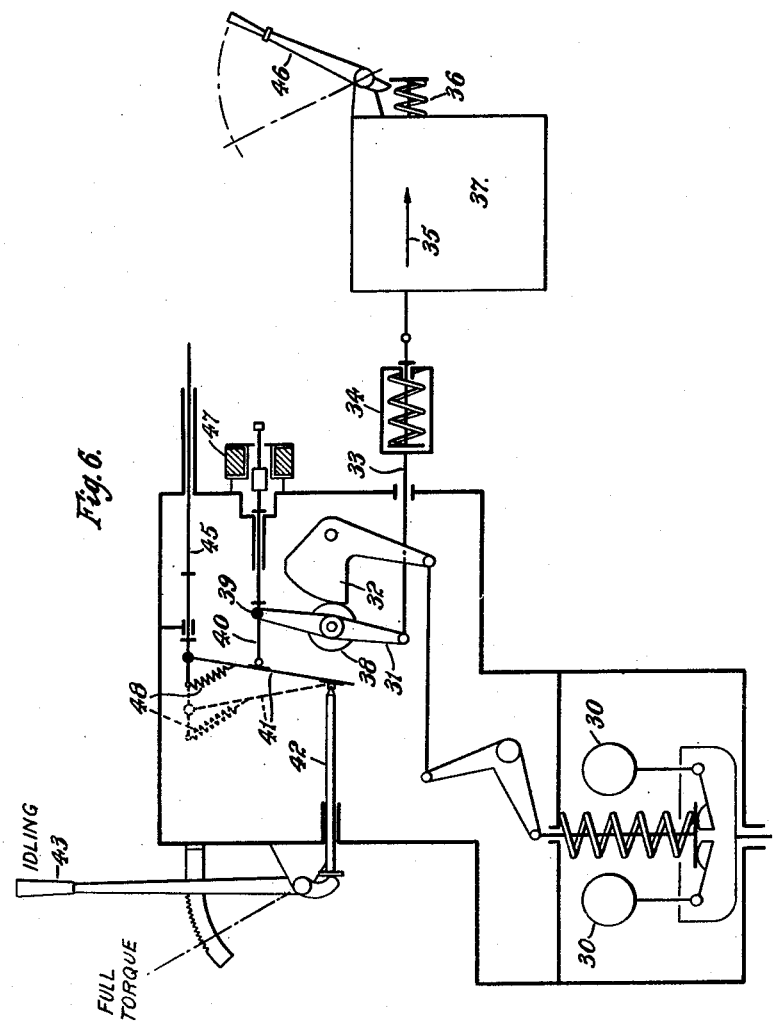

Patented Dec. 2, 1952

2,619,800

UNITED STATES PATENT OFFICE 2,619,800

INTERNAL-COMBUSTION ENGINE POWER PLANT

Louis Frederick Rudston Fell, Littleover, England, assignor to Fell Developments Limited, London, England, a British company Application February 23, 1950, Serial No. 145,625
In Great Britain November 14, 1949

10 Claims. (Cl. 60—97)

This invention relates to a power unit comprising two main compression ignition internal combustion engines which are supercharged to a pressure which is maintained at a predetermined maximum up to a predetermined engine speed and thereafter falls as the engine speed increases, the fuel injection of each engine being separately governed to produce an engine torque which decreases as the engine speed increases over the running speed range of the engine, a differential gear, means whereby each main engine drives a sun wheel of this gear through a variable filling fluid coupling, means for transmitting power from the planet carrier of the said differential gear to the mechanism which is to be driven by the power unit, and a unidirectional device operative on each sun wheel allowing that wheel to be driven by its associated main engine in one direction of rotation, but not in the other. The invention further relates to a power plant comprising two power units each as described above, the planet carrier of the differential gear of each unit, hereinafter called the primary differential gears, being arranged to drive a sun wheel of a further differential gear, hereinafter called the secondary differential gear, the planet carrier of which is adapted to drive the aforesaid driven mechanism.

In operation the main engines of the unit are brought, by means of controls which override the action of the main engine governors, from rest or from idling speed to their conditions of maximum torque successively as the speed of the driven mechanism increases. Thus in starting the mechanism from rest, one main engine is first brought to its condition of maximum torque, during which operation the associated fluid coupling fills and transmits the torque to the sun wheel of the differential gear. The other main engine is still stationary or idling, but the sun wheel associated therewith cannot be driven backwards owing to the associated unidirectional device. The torque of the main engine under load is thus multiplied by a factor of 2 before being applied to the driven mechanism. When this mechanism has reached a speed such that the slip in the fluid coupling has been reduced to a suitable value, the second main engine is brought to its condition of maximum torque. During the latter operation the associated fluid coupling fills, and when the torque of the second main engine equals that of the first main engine, the second engine drives its sun wheel at the same speed as the first and the sum of the torques of the two main engines is transmitted to the driven mechanism. In a power plant comprising two of the power units described above, the same procedure is followed, it being understood that the gear ratio when only one engine is under load is 4:1, and as the second, third and fourth engines are successively brought into operation this ratio decreases to 2:1, 4:3 and finally 1:1. When all the engines of the unit or plant have been brought under load, the mechanism can be accelerated to a maximum speed dependent on the maximum speed of the main engines.

The present invention consists in an improvement in or a modification of the power unit or plant hereinbefore described. According to the invention the torque available at the driven mechanism at starting and low speed is increased without the necessity of a corresponding sacrifice of speed at the high-speed end of the running speed range, by providing means whereby the planet carrier of at least one of the differential gears is driven at different torque ratios by the respective main engines or power units which drive the said planet carrier.

The aforesaid means may be constituted by the sun wheels of the said differential gear themselves, these sun wheels being in such case of different diameters so that they transmit the drives of the respective engines or power units as the case may be to the planet carrier of the differential gear at different torque ratios. Alternatively, the aforesaid means may consist of torque-transmitting means of different torque ratios between the respective sun wheels of the said differential gear and the main engines or power units which drive those sun wheels. Since it is usually convenient to drive the sun wheels through toothed gears, such torque-transmitting means may advantageously consist of the toothed gears which are used to drive the sun wheels in question, so that the invention can be carried into effect simply by making a suitable selection of the gear ratios of the several toothed gears.

The invention is illustrated by way of example by the accompanying drawings, in which Figure 1 is a diagrammatic elevation with part of the cowling cut away of a railway locomotive having a plant of the kind hereinbefore described, Figure 2 is a plan view of the locomotive with the cowling removed, Figure 3 is a diagrammatic plan view of the interior of the gear box of the locomotive, incorporating the gear ratios of the present invention, Figure 4 is a diagrammatic end view of certain of the gear wheels shown in Figure 3, Figure 5 shows graphs of the relationship between the tractive effort and speed of a locomotive with and without the gear ratios of the invention, and Figure 6 is a diagrammatic representation of one of the main engine governors.

Figures 1 and 2 represent diagrammatically a railway locomotive driven by a power plant comprising four main compression ignition internal combustion engines $1a$, $1b$, $1c$ and $1d$. These engines drive the sun wheels of two primary differential gears through shafts $4a$, $4b$, $4c$ and $4d$, variable-filling fluid couplings $2a$, $2b$, $2c$ and $2d$ and shafts $5a$, $5b$, $5c$ and $5d$ respectively. The planet carriers of the primary differential gears drive the respective sun wheels of a secondary differential gear, the planet carrier of which transmits its drive to the wheels of the locomotive. The primary and secondary differential gears and the transmission gear to the wheels of the locomotive are housed in a gear box 3.

Mounted on the gear box 3 are two auxiliary compression ignition internal combustion engines $6x$ and $6y$. These engines drive blowers $7x$ and $7y$, the outputs of which are passed to duct systems $8x$ and $8y$ connected with the inlet manifolds of the pairs of main engines $1a$, $1b$ and $1c$, $1d$ respectively.

Each of the sun wheels of the primary differential gears is provided with a unidirectional device $9a$, $9b$, $9c$ or $9d$ which permits the sun wheel to rotate in one direction but not in the other.

Each main engine is provided with a governor shown schematically at $27a$, $27b$, $27c$ and $27d$ which is arranged to control the fuel injection of the engine in such a manner that the engine torque decreases from a maximum value as the engine speed increases over the running speed range of the engine.

Each governor (see Figure 6) comprises flyweights 30 which actuate a lever 31 by way of the linkage shown and a cam 32. The lower end of the lever 31 is pivoted to a rod 33 which is connected with the fuel control rack of the fuel injection pump 37 through an extensible link 34. Movement of the rod 33 in the direction of the arrow 35 has the effect of reducing the fuel injection to the engine, and the rod is urged in this direction by a spring 36. The lever 31 is provided at its centre with a cam roller 38 and is pivoted at 39 to a rod 40 the other end of which abuts against a lever 41. The latter is pivoted at its upper end to a rod 45, and at its lower end abuts under the action of a tension spring 48 against a rod 42 the other end of which is actuated by a regulator lever 43 in the cab of the locomotive. The lever 43 is common to all the main engine governors, that is to say it is arranged to actuate simultaneously the rods 42 of all four governors. For the sake of simplicity, the regulator lever 43 and the rods 42 connecting it with the several governors are not shown in Figure 2.

The end of the rod 45 ($45a$, $45b$, $45c$, $45d$ in Figure 2) remote from the lever 41 is pivoted to the lever 26 ($26a$, $26b$, $26c$, $26d$ in Figure 2) which controls the scoop of the fluid coupling 2 ($2a$, $2b$, $2c$, $2d$ in Figures 1 and 2) driven by the main engine the governor of which is being described, the arrangement being such that when the coupling is emptied, the rod 45 moves to the left from the position shown in Figure 6 in solid lines toward the position indicated in dotted lines, sufficiently far to restrict the fuel injection of that main engine to the idling charge. When, however, the coupling is filled, the rod 45 moves to the full line position shown in Figure 6 at which it no longer restricts the fuel injection. It will be understood that while the interlock between the lever 41 and the scoop control is shown for simplicity as being mechanical, other means may be used. The governor is provided with a solenoid 47 which is energised with the starting motor of the engine so as to pull the lever 31 in a clockwise direction to increase the fuel injection to the value required for starting. Each governor is further provided with a stopping lever 46 which, with the aid of the link 34, can be used to stop the engine regardless of the position of the lever 31.

The auxiliary engines $6x$ and $6y$ (Figure 2) are both provided with a governor of known kind (not shown) which governs the engine to a constant speed. This speed is so selected that the blowers $7x$ and $7y$ can deliver air to the main engines at a maximum supercharging pressure until, but only until, the speed of these engines reaches a predetermined value. At main engine speeds higher than that value, the supercharging pressure falls steadily, while at speeds lower than that value the supercharging pressure is maintained constant by means of a blow-off valve $44x$ and $44y$. The profile of the cam 32 is such that, with the supercharging arrangements as stated, the torque of the main engine is at a maximum at the minimum operating speed of the engine, for example, 200 R. P. M., and thereafter falls steadily as its speed increases. The governor thus serves to keep the torque of the engine on a predetermined torque/speed curve. The function of the regulator 43 is to shift the fulcrum 39 of the lever 31 so as to control the zero setting of the governor and hence the line of zero torque with respect to which the torque speed curve is to be regarded as plotted. This control is effected by the lever 43 simultaneously for all the main engines.

The interior of the gear box 3 is shown schematically in Figure 3. The shafts $5a$, $5b$, $5c$ and $5d$ drive shafts $11a$, $11b$, $11c$ and $11d$ respectively through bevel gears $10a$, $10b$, $10c$ and $10d$. Fixed to the shafts $11a$ and $11b$ respectively are the sun wheels of a primary differential gear unit $12x$. The numeral $12x$ denotes the casing, which is also the planet carrier, of the gear unit, the sun and planet wheels of which are not visible in the drawing. Likewise the shafts $11c$ and $11d$ have fixed to them the sun wheels of a second primary differential gear unit $12y$. Fixed to the planet carriers of the gears $12x$ and $12y$ respectively are gear wheels $13x$ and $13y$ which engage gear wheels $14x$ and $14y$ fixed to shafts $15x$ and $15y$. The shafts $15x$ and $15y$ respectively have fixed to them the sun wheels of a secondary differential gear 16 of which the sun and planet wheels are not visible in the drawings. A gear wheel 17 is fixed to the planet carrier of the gear 16. It will be understood from Figure 4 that the axis of the secondary differential gear 16 is situated below the level of those of the primary differential gears 12x and 12y.

The gear wheel 17 drives a reversible transmission gear indicated generally at 18 (Figure 1), which in turn drives the wheels of the locomotive.

The unidirectional device 9a is a self-sliding synchro coupling which is shown schematically as comprising a toothed member 19a which is threaded on the splined end of the shaft 11a. The teeth of the member 19a are adapted to engage internal teeth in a member 20a which is fixed to one set of plates of a friction clutch 21a. The other set of clutch plates, which interdigitate with those of the first set, are prevented from rotating. When the clutch plates are in engagement, the member 20a is held against rotation, and if the shaft 11a begins to rotate in a direction opposite to that denoted by the arrow (that is, in the "reverse" direction) the member 19a will move axially into engagement with the member 20a, thus preventing further reverse rotation of the shaft. Means (not shown) are provided for releasing the clutch 21a when it is not desired to transmit torque to the wheels of the locomotive. The other unidirectional devices 9b, 9c and 9d are the same as the device 9a except that in these devices no release clutch is provided.

The feature which characterises the power plant shown in the accompanying drawings lies in the selection of the gear ratios at which the shafts 15x and 15y are driven by the planet carriers 12x and 12y, which ratios are hereinafter referred to as the "primary-to-secondary gear ratios." These gear ratios will now be defined as the ratios of the numbers of teeth in the gear wheels 14x and 14y to the numbers of teeth in the gear wheels 13x and 13y respectively and are thus the same as the torque ratios at which the respective sun wheels of the differential gear 16 are driven by the two power units which constitute the power plant. In previously proposed power plants of the type to which the invention relates, both the primary-to-secondary gear ratios have the same value, which may be denoted by $r$. In order to explain more clearly the basis on which the gear ratios are selected in the present invention, this selection will be regarded as a modification of a power plant having equal ratios $r$ and so designed that the requisite tractive effort/speed relationship is obtained at the high speed end of the running speed range but that a greater tractive effort is required at starting and low speeds. In order to attain this result, one of the aforesaid gear ratios is given a value $pr$ and the other is given a value $qr$ where $p$ is the factor by which it is desired to multiply the tractive effort at starting and low speeds and the sum of $1/p$ and $1/q$ is equal or substantially equal to 2. In the example shown in the drawings, which is suitable for application to a fast passenger locomotive, the primary-to-secondary gear ratio from planet carrier 12x to shaft 15x is equal to 1.25 and that from planet carrier 12y to shaft 15y is equal to 0.825. Thus in this case the hypothetical power plant serving as a basis of comparison has gear ratios such that $r$ is equal to unity, $p$ being equal to 1.25 and $q$ to 0.825.

The operation of the plant will now be described. In order to start the locomotive, main engine 1a and fluid coupling 2a and main engine 1b and fluid coupling 2b are successively brought into their working condition by means of the controls 26a and 26b in the manner already described, it being noted that the gear ratios at which the engines 1a and 1b drive their respective sun wheels (hereinafter referred to as the "engine-to-primary gear ratios") are equal to one another in the case described. Owing to the fact that the primary-to-secondary gear ratio is $pr$, the output torque at the wheel 17, and hence the tractive effort at the wheels of the locomotive, during this period of operation, is $p$ times as great as would have been the case if the ratio had been $r$. As the locomotive accelerates, the rate of acceleration being determined by the regulator 43 under the driver's control, the torque exerted by the main engines 1a and 1b decreases steadily from the maximum value. When the torque at the shaft 15x has fallen to about the maximum torque which the engine 1c or 1d working through the differential gear 12y and the gear wheels 13y and 14y can exert at the shaft 15y, one of the engines 1c or 1d is brought to its condition of maximum torque by operation of the appropriate lever 26c and 26d. When the torque at the shaft 15y equals the falling torque at the shaft 15x, shaft 15y begins to rotate. The locomotive continues to accelerate again under the control of the regulator 43, and when, at a predetermined locomotive speed, the slip in the fluid coupling 2c or 2d as the case may be has fallen to a suitable value, the fourth engine is brought to its condition of maximum torque. It will be understood that as each main engine is brought under load, the locomotive, assuming a constant load, will accelerate without any decrease in tractive effort while the slip rate of the associated fluid coupling decreases. When the locomotive has reached a speed at which all the fluid couplings are working at a steady rate of slip, the tractive effort/speed curve approaches closely to that of the hypothetical power plant having primary-to-secondary gear ratios both equal to $r$, since in both cases the speed at which the wheel 17 is rotating is nearly proportional to $2r$.

It will be understood that the result described above is obtained at some sacrifice of tractive effort in an intermediate speed range. This is due to the fact that the engines 1c and 1d (in the example illustrated) cannot begin to contribute their torques to the tractive effort until the torque due to the engines 1a and 1b has fallen to a value substantially lower than the maximum, whereas in the case of the equally geared pairs of engines the second pair can contribute their torque while that of the first pair is still at or near its maximum value. The sacrifice of tractive effort at an intermediate speed range is not, however, of importance in many applications, for example in the case of a fast passenger locomotive. In such cases the performance is determined mainly by the tractive effort at low speeds and the power output at high speeds. In the case illustrated there is a loss of tractive effort from a maximum of about 15 per cent at 17 M. P. H. to a negligible figure at 37 M. P. H., but this is not of importance in assessing the performance of the locomotive over normal roads.

The mode of operation described above is illustrated graphically in Figure 5, in which the abscissae represent locomotive speeds and the ordinates tractive effort. The curve ABCDE is drawn for a locomotive embodying the invention and curve PQR for the hypothetical locomotive having equal gear ratios. The curves ABCF and LMN show the tractive effort/speed relationship which would be obtained respectively with the low-geared and high-geared engines alone, so that the curve ABCDE represents the sum of the curves ABF and LMN.

The part AB of the curve ABCDE represents the period of operation during which the two low-geared engines 1a and 1b are brought into operation and the locomotive is accelerating while the slip in the associated fluid couplings decreases, B being the point at which the slip rate reaches a steady value. It will be seen that the tractive effort during this period is greater than that obtained on the portion PQ of the curve PQR, the latter portion corresponding with the bringing into operation of the four engines of the hypothetical equally geared plant.

From point B to point C the torque of the low-geared engines decreases, the line BC crossing PQ at X. When the tractive effort has reached the value represented at C, the high-geared engines 1c and 1d are brought into operation, the locomotive accelerating at constant tractive effort while the slip in the fluid couplings decreases. At D the slip rate in all four fluid couplings reaches a steady value and thereafter the locomotive accelerates on the falling tractive effort curve DE, the maximum speed E corresponding with the maximum speed of the main engines. It will be seen that the curve DE closely approaches the curve QR, the maximum speeds E and R being approximately equal.

The result of the unequal gearing is thus to increase the tractive effort over the speed range ABX, without substantial sacrifice over the range DE. There is, however, a loss of tractive effort over the range XCD but this loss is not of practical importance in the performance of the locomotive.

Instead of introducing the gear ratios $pr$ and $qr$ at the primary-to-secondary stage as shown in the drawings, the same result could be obtained by making the engine-to-primary gear ratios of engines 1a and 1b equal to $pr$, and of engines 1c and 1d equal to $qr$, the primary-to-secondary ratios both reverting to their unmodified value of $r$. Again, the engine-to-primary gear ratios of three engines could be given the value $qr$ and that of the fourth engine the value $pr$. In this case the performance at starting and high speeds would be the same as in the case illustrated, but the speed range in which the loss of tractive effort would occur would be shifted towards the low speed end of the running speed range. Moreover, it would also be possible to obtain the same performance at the low and high speed ends of the running speed range by making the engine-to-primary gear ratios of engines 1a and 1c both equal to $pr$ and the engine-to-primary gear ratios of engines 1b and 1d both equal to $qr$.

The considerations applying to the plant illustrated, containing two of the power units hereinbefore described, also apply to a plant containing only one such unit, in which case it is the engine-to-primary gear ratios that will be given the values $pr$ and $qr$. Similarly the invention may be applied to a power plant containing more than two units, similar considerations likewise being applicable.

I claim:

1. A power plant which includes at least one power unit comprising two main compression-ignition internal combustion engines; means for supercharging said engines to a pressure which is maintained at a predetermined maximum up to a predetermined engine speed and thereafter falls as the engine speed increases; a governor for each said engine for controlling the fuel injection thereof to produce an engine torque which decreases as the engine speed increases over the running speed range of the engine; a differential gear, each sun wheel of which is driven by one of said engines through a variable filling fluid coupling; torque-transmitting means including said sun wheels and fluid couplings whereby torque is transmitted to the planet carrier of said differential gear at different torque ratios from the respective engines; means for transmitting power from the planet carrier of said differential gear to driven mechanism; and a unidirectional device operative on each sun wheel allowing that wheel to be driven by its associated engine in one direction of rotation but not in the other.

2. A power plant according to claim 1, wherein the sun wheels of said differential gear are of different diameters.

3. A power plant according to claim 1, wherein at least one of said torque-transmitting means comprises a pair of meshing toothed gear wheels interposed between the sun wheel included in said torque-transmitting means and the engine which drives said sun wheel.

4. A power plant according to claim 1, wherein one of the said different torque ratios is equal to $pr$ and the other is equal to $qr$, where $r$ stands for the value which, if both torque ratios were equal, such torque ratio should have in order to give a desired tractive effort/speed relationship at the high speed end of the running speed range but a low tractive effort at starting and low speeds, $p$ stands for the factor by which it is desired to multiply the said low-speed tractive effort, and the sum $1/p$ and $1/q$ is equal or substantially equal to 2.

5. A power plant according to claim 4, wherein said different torque ratios are substantially in the ratio 1.25:0.825 to each other.

6. A power plant which includes two power units each comprising two main compression-ignition internal combustion engines, means for super-charging said engines to a pressure which is maintained at a predetermined maximum up to a predetermined engine speed and thereafter falls as the engine speed increases, a governor for each said engine for controlling the fuel injection thereof to produce an engine torque which decreases as the engine speed increases over the running speed range of the engine, a primary differential gear each sun wheel of which is driven by one of said engines through a variable filling fluid coupling, and a unidirectional device operative on each sun wheel allowing that wheel to be driven by its associated engine in one direction of rotation but not in the other; a secondary differential gear each sun wheel of which is driven by the planet carrier of one of said primary differential gears; torque transmitting means including said sun wheels whereby torque is transmitted to the planet carrier of said secondary differential gear at different torque ratios from the planet carriers of the respective primary differential gears; and means for transmitting power from the planet carrier of said secondary differential gear to driven mechanism.

7. A power plant according to claim 6, wherein the sun wheels of said secondary differential gear are of different diameters.

8. A power plant according to claim 6, wherein at least one of said torque transmitting means comprises a pair of meshing toothed gear wheels interposed between the sun wheels included in said torque-transmitting means and the planet carrier of the primary differential gear which drives said sun wheel.

9. A power plant according to claim 6, wherein one of the said different torque ratios is equal to $pr$ and the other is equal to $qr$, where $r$ stands for the value which, if both torque ratios were equal, such torque ratio should have in order to give a desired tractive effort/speed relationship at the high speed end of the running speed range but a low tractive effort at starting and low speeds, $p$ stands for the factor by which it is desired to multiply the said low-speed tractive effort, and the sum of $1/p$ and $1/q$ is equal or substantially equal to 2.

10. A power plant according to claim 9, wherein said different torque ratios are substantially in the ratio of 1.25:0.825 to each other.

LOUIS FREDERICK RUDSTON FELL.

REFERENCES CITED

The following references are of record in the file of this patent:

UNITED STATES PATENTS

| Number | Name | Date |
|---|---|---|
| 1,076,632 | Gammeter | Oct. 21, 1913 |
| 1,315,962 | Hussander | Sept. 16, 1919 |
| 1,710,962 | Banner | Apr. 20, 1929 |
| 1,868,130 | Bauer et al. | July 19, 1932 |
| 1,953,486 | Kiep | Apr. 3, 1934 |
| 2,180,108 | Heinzelmann | Nov. 14, 1939 |
| 2,283,431 | Gasser | May 19, 1942 |
| 2,300,977 | Schlaepfer | Nov. 3, 1942 |
| 2,403,398 | Reggio | July 2, 1946 |